July 22, 1952
A. A. WHITE
2,604,299
VEHICLE JACK
Filed July 21, 1947
3 Sheets-Sheet 1
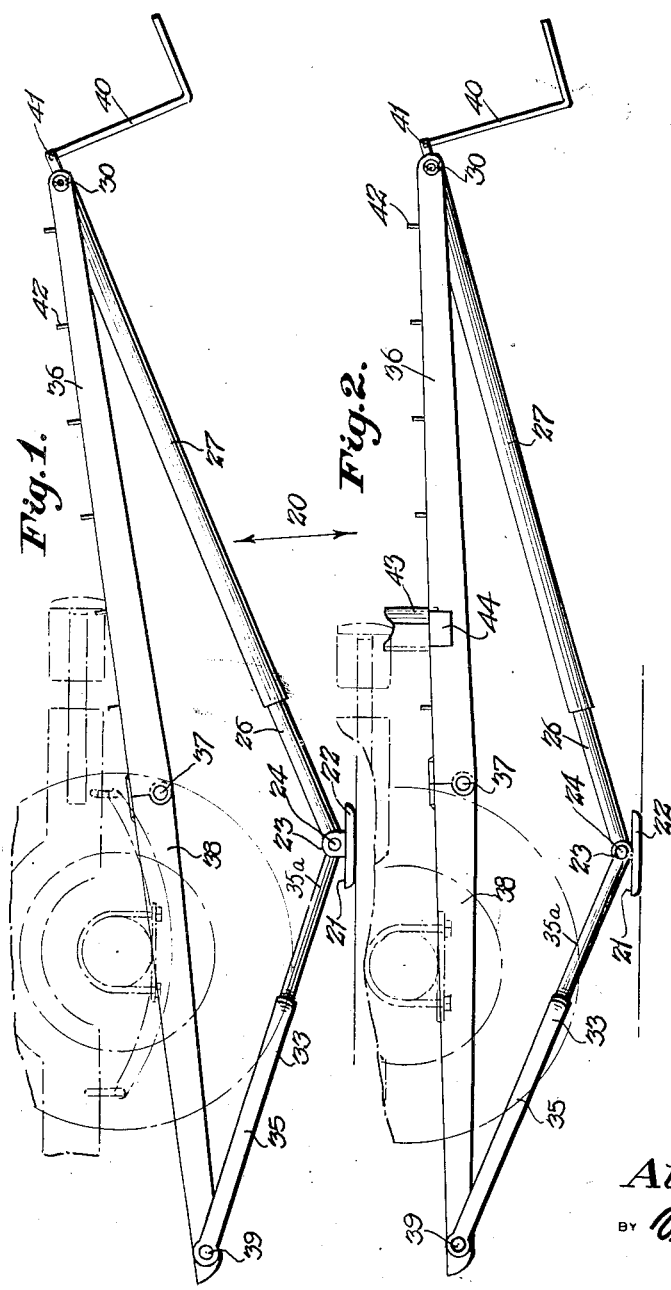
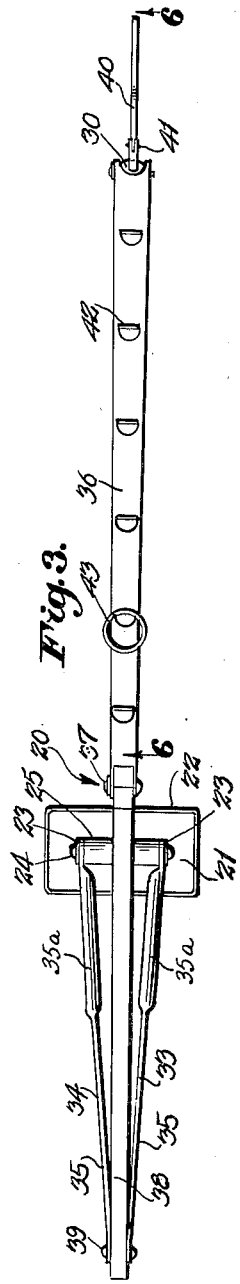
INVENTOR.
Allen A. White
BY Victor J. Evans & Co.
ATTORNEYS

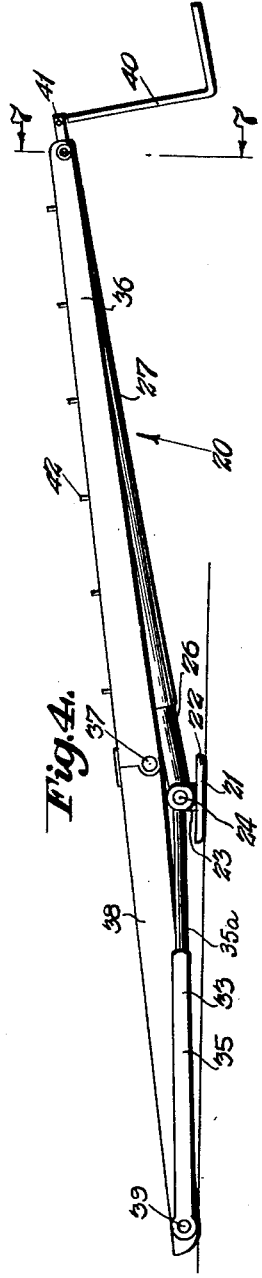
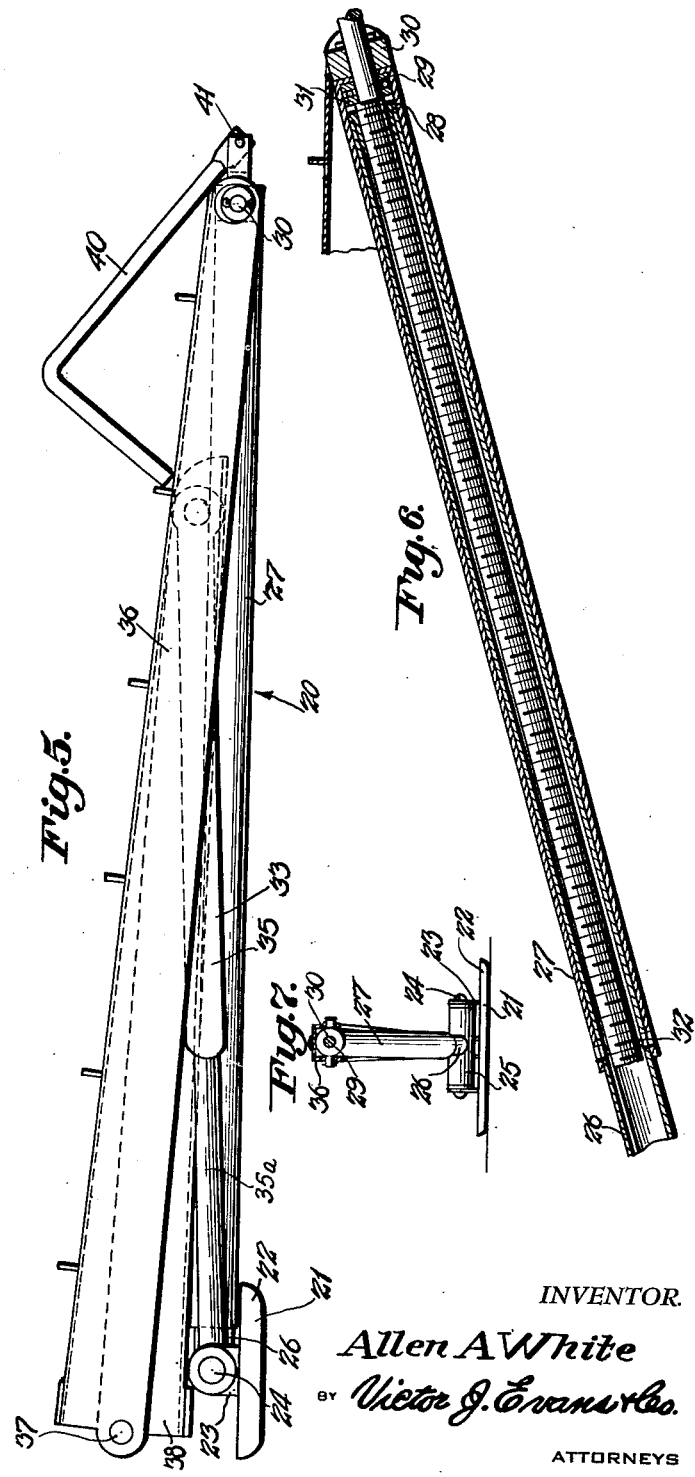

July 22, 1952
A. A. WHITE
2,604,299
VEHICLE JACK
Filed July 21, 1947
3 Sheets—Sheet 3
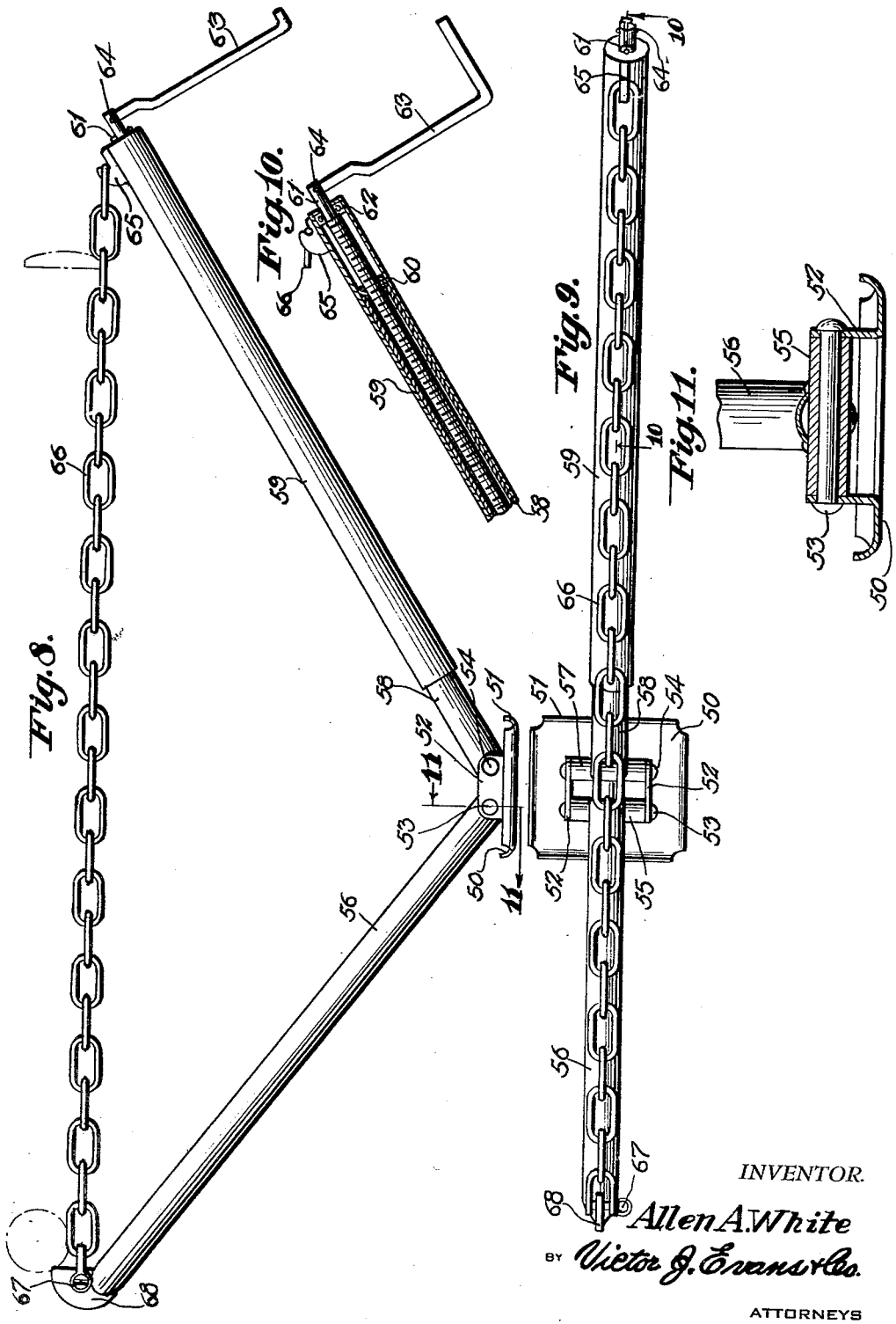
INVENTOR.
Allen A. White
BY Victor J. Evans & Co.
ATTORNEYS Patented July 22, 1952

2,604,299

UNITED STATES PATENT OFFICE 2,604,299

VEHICLE JACK

Allen A. White, Wichita, Kans.

Application July 21, 1947, Serial No. 762,228

12 Claims. (Cl. 254—100)

This invention relates to improvements in automobile jacks, and more particularly to a triangular type of automobile jack.

An object of the invention is to provide a combination axle and bumper jack that has sufficient capacity and convenience to prove efficient in the cars of today that are swung low, close to the ground.

The stabilizing structure of the jack, its two-point contact with the axle and the bumper, the convenience of placement with regard to the automobile, even under a very low axle and even though the wheel is not on the axle, the ease of operation and its simplicity in construction makes a desirable construction which is inexpensive also to manufacture.

With the above and other objects and advantages in view, the invention consists of the novel details of construction, arrangement and combination of parts more fully hereinafter described, claimed and illustrated in the accompanying drawings in which:

Figure 1 is a side elevational view of an embodiment of the invention shown in place for raising one end of an automobile;

Figure 2 is the same, with an additional bumper support added thereto;

Figure 3 is a top plan view of Figure 2;

Figure 4 is an elevational view of the device in its lowest position;

Figure 5 is an elevational view of the device in collapsed or folded position and in slightly enlarged scale;

Figure 6 is a sectional view on the line 6—6 of Figure 3;

Figure 7 is a sectional view on the line 7—7 of Figure 4;

Figure 8 is an elevational view of a modified form of the invention;

Figure 9 is a top plan view of Figure 8;

Figure 10 is a sectional view on the line 10—10 of Figure 9 with the chain broken away and Figure 11 is a sectional view on the line 11—11 of Figure 8.

Referring more in detail to the drawings, the reference numeral 20 designates the jack constructed in accordance with the invention. The jack 20 comprises a rectangular ground engaging base 21 having an upstanding peripheral flange 22. Along the longitudinal center thereof, the base is provided wit hopposed parallel vertical apertured ears 23, in which is mounted the bolt shaft 24. Rotatably mounted on the shaft 24 is the sleeve 25 which is secured to the lower end of the tubular member 26 which is telescopically received in the tubular member 27.

The upper end of the member 26 carries the threaded sleeve or bearing 28 which is in threaded engagement with the elongated screw 29 which extends outwardly of the member 27 and is rotatably mounted in the trunnioned member 30. A ball bearing race 31 carried at the upper end of the member 27 facilitates the rotation of the screw, which, at its lower end, is provided with the limiting or stop pin 32 which is frictionally driven into the inner portion of screw 29 through aligned openings in tubular members 26 and 27, so that it engages the lower end of the bearing 28 to limit the outwardly movement of the screw 29. Pivotally mounted on the shaft 24, at the outer ends of the sleeve 25 and inwardly of the ears 23 as shown in Figs. 1 to 5, are the lower ends of the inclined strut means shown as brace members 33 and 34 respectively, which have a flattened portion 35, and a cylindrical portion 35a. Thus elongate brace members 33 and 34 as well as elongate members 26, 27 are secured to a common base by shaft means, in the form of this invention illustrated by the drawings.

The trunnions of the member 30 are received in the sides of the channel member 36, at the outer end thereof, and the opposite end of this member 36 is hingedly connected at 37 to a second channel member 38, the member 38 carrying a pin 39, at its outer end on which the upper ends of the brace or strut members 33 and 34 are pivotally mounted by pin 39. Thus a triangular formation is obtained, the overall dimensions and positions of which as well as the angular relationships between its diverging strut elements 35a and 26, 27 may be changed by rotation of the screw 29 by means of the crank 40 pivotally connected to the outer end of the screw 29 at 41.

The member 36 tapers inwardly from the member 30, to its pivotal connection with the member 38 (see Fig. 3), at the hinge point 37, and the member 38 tapers outwardly from the hinge point 37 to its outer end, and the taper of the two together with their channel construction permits folding of the jack, as shown in Figure 5.

The upper surface of the member 36 is provided with the vertical upstruck ears 42 which will engage the bumper of the automobile, as shown in Figure 1, to prevent slipping of the automobile on the member 36. In Figure 2, a tubular spacing block or supporting member 43 is shown, mounted on the member 36. The block 43 is provided with depending lugs 44 which are in opposed relation to each other and straddle the member 36. The block is positioned so that one of the ears 42 engages the inner surface of the block 43 to prevent sliding movement of this block on the member 36 while the lugs 44 prevent sideway or lateral movement of the block.

In the position shown in Figure 4, the jack can be slid under the axle of an automobile, even though the wheel is not on the axle, a position which the automobile usually assumes when it slips from the type of jack in use at the present time, or should the wheel come off of the axle while travelling or while removing the wheel from the axle, or should the axle drop.

Rotation of the crank 40 raises the rear end of the member 36 which, abutting the hinged end of the member 38, forms a rigid structure, so that the automobile resting on either of the members is raised from the ground.

In Figures 8 to 11 inclusive, a modified form of the invention is shown, which comprises a substantially square shaped base 50 having upturned marginal flanges 51 and opposed vertically inclined apertured upstruck ears 52. The ears 52 respectively, and a tubular member 55, rotatably carried by the shaft 53, is secured at right angles to the lower end of the tubular base member 56. A similar tubular member 57 is rotatably carried by the shaft 54, which is secured at right angles to the tubular member 58, which is telescopically received in the tubular member 59. The upper end of the member 58 is provided with threaded sleeve or bearing 60 which is in threaded engagement with the elongated screw 61 which extends outwardly of the member 59 which carries the ball bearing race 62 for engagement with the screw 61. As in the previous views, the screw 61 has a crank handle 63 pivotally secured thereto at 64 for the rotation of the screw. The threaded sleeve or bearing 60 is rigidly secured to member 58 and is internally threaded for engagement with screw 61.

The upper end of the member 59 is provided with the hook 65 which is adapted to be engaged in the links of the chain 66 which is attached at one end by a removable eye bolt 67 to the semi-circular keeper and stop 68 secured to the upper end of the member 56.

The use of this form of the invention is similar to that previously described, except that the weight of the automobile is carried by the chain 66, and the links provide stops similar to the ears 42 on the member 36.

There has thus been provided a jack having a two point contact with an automobile, namely the axle and bumper, a jack that will provide lifting engagement with an axle regardless of its distance from the ground, a jack which is stable, safe, easy to operate and inexpensive to manufacture. This invention thus provides a jack comprising a strut mounted at an acute base angle and a second strut or brace arm pivotally mounted at its base, the two mutually diverging from their base ends by more than ninety degrees from each other. Both struts may be pivotally mounted and the relative length of the struts can be changed. Thus their upper ends and the automobile support adapt themselves to various loads and positions but elevate or lower the load both quickly and easily. These long and relatively variable arms moving from low base angles give effective leverage and cradling for the load, and also utilize the car itself in conveying the stresses that are involved.

It is believed that from the foregoing description, the operation and construction of the jack will be apparent to those skilled in the art, and it is to be understood that changes in the minor details of construction, arrangement and combination of parts may be resorted to, provided they fall within the spirit of the invention and the scope of the appended claims.

Having thus described the invention, what is claimed as new and desired to be secured by Letters Patent is:

1. An automobile jack of the character described, comprising a base, shaft means carried by said base, a tubular member carried by said shaft means, a second tubular member telescopically receiving said first tubular member, an elongated screw carried by said tubular members, means carried by said first tubular member to provide a threaded engagement of said member with said screw, bracing means carried by said shaft means, said tubular members and said bracing means extending in diverging angular relation to each other and weight supporting means connecting the upper ends of said bracing means and said second tubular member.

2. The invention as in claim 1, wherein said weight-supporting means comprises a pair of longitudinally aligned channel shaped members hinged together at their inner ends and respectively pivoted to the bracing means and to the second tubular member at their outer ends.

3. The invention as in claim 1, wherein said weight-supporting means comprises a chain which extends between and secures the upper ends of the bracing means and second tubular member.

4. The invention as in claim 1, wherein said shaft means comprises a single shaft on which both the bracing means and first tubular member are mounted.

5. The invention as in claim 1, wherein said shaft means comprises a pair of parallel disposed shafts on which the bracing means and first tubular member are independently mounted.

6. An automobile jack of the character described comprising a strut member mounted on a base at an acute base angle, a second strut member pivotally mounted on the base at its lower end for angular divergence from the lower ends of the two strut members of more than ninety degrees, means to extend the length of one of the strut members relatively to the other, and means carried by at least one of the strut members to support an automobile.

7. An automobile jack of the character described comprising a pair of strut members separately pivotally supported at their lower ends on a common base and adapted to swing from acute base angles in variable angular divergence from each other from their lower ends of more than ninety degrees, means to extend the length of one strut member relatively to the other, and means carried by at least one of the strut members to support an automobile.

8. An automobile jack as defined in claim 7, wherein said means to support an automobile comprises a hook element carried by at least one of the strut members.

9. An automobile jack of the character described, comprising a base, shaft means pivotally carried by said base, an elongate member carried by said shaft means and mounted to swing upwardly thereon from an acute base angle, a second elongate member extensibly connected with said first elongate member, an elongated screw carried by one of said elongate members and means carried by the other of said elongate members to provide threaded engagement with said screw for extension of length of the elongate members, an arm to provide bracing means pivotally carried by and adapted to swing upwardly on said shaft means, said elongate members and said bracing means extending in diverging angular relation to each other, and weight-supporting means secured to upper parts of said bracing means and of said second elongate member.

10. An automobile jack of the character described comprising a base, shaft means carried by said base, an elongate member pivotally carried by said shaft means and mounted to swing upwardly thereon from an acute base angle, a second elongate member extensibly engaging said first elongate member, and means carried by said members to effect relative extension of length between the two members, an arm to provide bracing means pivotally supported on and adapted to swing upwardly on said shaft means, said elongate members and said bracing means extending from said shaft means in diverging angular relation to each other, and weight-supporting means adapted to engage an automobile and secured to said bracing means and to said second elongate member.

11. A vehicle jack comprising a horizontal base plate, a pair of strut members, one of said strut members being pivotally mounted on a horizontal pivot on said base to swing in a vertical plane, means at the outer end of said strut member to engage the axle of a vehicle, the other strut member being provided with a member movable thereon, said other strut being connected to the base, means on said movable member to engage the bumper of the vehicle, and actuating means for moving the movable member to cause relative movement of the struts to thereby raise the vehicle.

12. An automobile jack comprising a common base, a pair of strut members pivotally mounted at their inner ends upon said base to swing in a vertical plane, one of said struts including extensible sections, a collapsible member extending between the outer ends of the struts and detachably connected thereto, and means for moving one of said extensible sections relative to the other section.

ALLEN A. WHITE.

REFERENCES CITED

The following references are of record in the file of this patent:

UNITED STATES PATENTS

| Number | Name | Date |
| --- | --- | --- |
| 298,568 | Fisher | May 13, 1884 |
| 1,081,013 | Bunn | Dec. 9, 1913 |
| 1,611,366 | Peterson et al. | Dec. 21, 1926 |
| 1,725,216 | Seldomridge | Aug. 20, 1929 |
| 1,918,783 | Redding | July 18, 1933 |
| 2,054,445 | Tozzi | Sept. 15, 1936 |
| 2,233,536 | Kelley | Mar. 4, 1941 |
| 2,272,559 | Hebbert | Feb. 10, 1942 |
| 2,373,848 | Owens | Apr. 17, 1945 |